(12) United States Patent
Iida et al.

(10) Patent No.: US 12,107,624 B2
(45) Date of Patent: Oct. 1, 2024

(54) TERMINATION DETERMINATION DEVICE AND TERMINATION DETERMINATION METHOD

(71) Applicant: Nippon Telegraph and Telephone Corporation, Tokyo (JP)

(72) Inventors: Hiroyuki Iida, Musashino (JP); Hidenobu Hirota, Musashino (JP); Takui Uematsu, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 72 days.

(21) Appl. No.: 18/010,311

(22) PCT Filed: Jun. 26, 2020

(86) PCT No.: PCT/JP2020/025190
§ 371 (c)(1),
(2) Date: Dec. 14, 2022

(87) PCT Pub. No.: WO2021/260913
PCT Pub. Date: Dec. 30, 2021

(65) Prior Publication Data
US 2023/0231625 A1    Jul. 20, 2023

(51) Int. Cl.
*H04B 10/071* (2013.01)

(52) U.S. Cl.
CPC .................. *H04B 10/071* (2013.01)

(58) Field of Classification Search
CPC .................................................. H04B 10/071
(Continued)

(56) References Cited

U.S. PATENT DOCUMENTS

| | | | |
|---|---|---|---|
| 2005/0041902 A1* | 2/2005 | Frigo | G02B 6/447 385/1 |
| 2011/0217004 A1* | 9/2011 | Niimi | G02B 6/2852 385/32 |

(Continued)

FOREIGN PATENT DOCUMENTS

| | | |
|---|---|---|
| JP | 2002221467 | 8/2002 |
| JP | 2002221467 A * | 8/2002 |

(Continued)

OTHER PUBLICATIONS

Shimizu et al; (Optical Fiber Local-Light Injection and Detection Coupling System for Identification of Fiber; Jul. 1992; Electronics and Communications in Japan, Part 2, vol. 75, No. 4, pp. 1-9. (Year: 1992).*

*Primary Examiner* — Amritbir K Sandhu
(74) *Attorney, Agent, or Firm* — Fish & Richardson P.C.

(57) ABSTRACT

An object of the present invention is to enable identification of a reflection signal from a terminal portion of an optical fiber to be measured where a reflection signal caused by multiple reflection appears in an OTDR waveform in a mode in which an OTDR and the optical fiber to be measured are connected at a bent portion. The reflection signal caused by multiple reflection inevitably propagates through a distance equal to a distance between true reflection points more than the other reflection point, because of multiple reflection. Therefore, a distance between the reflection signal and another reflection signal is inevitably coincident with a distance between the other reflection signals. In contrast, in a case of a reflection signal from a terminal portion of the optical fiber, the distance between the reflection signal and another reflection signal is not coincident with the distance between the other reflection signals.

4 Claims, 5 Drawing Sheets

(58) Field of Classification Search
USPC .......................................................... 398/16
See application file for complete search history.

(56) References Cited

U.S. PATENT DOCUMENTS

| | | | | |
|---|---|---|---|---|
| 2014/0307251 A1* | 10/2014 | Liang | ................... | G01M 11/088 356/73.1 |
| 2022/0166502 A1* | 5/2022 | Hirota | ................ | H04Q 11/0067 |
| 2022/0228947 A1* | 7/2022 | Iida | ........................ | G01M 11/35 |

FOREIGN PATENT DOCUMENTS

| JP | 2013002952 | 1/2013 |
|---|---|---|
| JP | 5637914 | 12/2014 |
| JP | 2018096788 | 6/2018 |
| JP | 2018096788 A * | 6/2018 |

* cited by examiner

TERMINATION DETERMINATION DEVICE AND TERMINATION DETERMINATION METHOD

CROSS-REFERENCE TO RELATED APPLICATIONS

This application is a National Stage application under 35 U.S.C. § 371 of International Application No. PCT/JP2020/025190, having an International Filing Date of Jun. 26, 2020. The disclosure of the prior application is considered part of the disclosure of this application, and is incorporated by reference in its entirety into this application.

TECHNICAL FIELD

The present disclosure relates to a termination determination device determining a terminal state of an optical fiber, and to a method thereof.

BACKGROUND ART

An FTTH (Fiber To The Home) service connecting an access network between a communication building and a user home by an optical fiber is mainly provided by a network in a PON mode in which a branch splitter (hereinafter, referred to as "external branch SP") is provided outside the communication building to branch the optical fiber. In an optical line opening construction in the PON mode, determination whether an optical fiber from the external branch SP on the user home side is an active optical fiber or an inactive optical fiber in a construction site is an important matter of confirmation in a process of identifying the optical fiber under construction. The active optical fiber refers to an optical fiber already used by a specific user, and the inactive optical fiber refers to an optical fiber not used by any user.

To quickly and efficiently open the optical line in response to application for use of the optical line from a user, the optical fibers on a downstream of the external branch SP are previously laid up to utility poles near a residential area in units of a cable. In the optical line opening construction, the optical fiber housed in a cable is disconnected at a utility pole near a home of the user presenting the application, the optical fiber is dropped to the user home from the utility pole, and the optical fiber is connected to an optical network unit (hereinafter, referred to as "ONU") installed in the user home. Note that the utility pole from which the optical fiber is dropped to the user home is referred to as a drop pole.

The cable on the drop pole includes the active optical fiber and the inactive optical fiber together. A construction worker disconnects the inactive optical fiber among the optical fibers housed in the cable, and drops the disconnected optical fiber to the user home. Typically, numbers are imparted to the optical fibers housed in the cable, and information representing the active optical fiber or the inactive optical fiber is registered for each of the numbers of the optical fibers, in a facility management operation system of a communication provider. However, the registered information on the optical fiber in the system and an actual use state of the optical fiber may not be coincident with each other due to human error or the like. Therefore, as described above, in the optical line opening construction in the PON mode, confirmation of the active optical fiber and the inactive optical fiber among the plurality of optical fibers housed in the cable is especially important in order to prevent erroneous disconnection of the active optical fiber not under construction.

Some methods of determining whether the optical fiber on the downstream of the external branch SP in the PON mode is the active optical fiber or the inactive optical fiber in the construction site have been proposed. For example, Patent Literature 1 discloses a method in which an optical fiber on the downstream of the external SP is bent, and uplink communication light from the ONU is detected as leakage light to determine whether the ONU is connected to the target optical fiber.

CITATION LIST

Patent Literature

Patent Literature 1: Japanese Patent No. 5637914

SUMMARY OF THE INVENTION

Technical Problem

In the method disclosed in Patent Literature 1, it is possible to confirm that the target optical fiber is the active optical fiber only while the ONU emits light; however, when the ONU is temporarily turned off, the ONU does not emit light, which is undetectable. Therefore, in the method disclosed in Patent Literature 1, although it is possible to determine whether the target optical fiber is the active optical fiber or the inactive optical fiber on the premise that the ONU is turned on, it is not possible to fully distinguish the active optical fiber and the inactive optical fiber because the ONU in a power-off state is undetectable.

In contrast, the ONU in the power-off state that is undetectable in the method disclosed in Patent Literature 1 can be detected by the following method. In this method, an optical time domain reflectometer (hereinafter, referred to as OTDR) causes test light with a plurality of wavelengths to enter a detection target optical fiber, from a bent portion of the target optical fiber. Further, in the method, it is determined whether a terminal portion of the target optical fiber is connected to the ONU in the power-off state by receiving and analyzing reflection light from the terminal portion of the optical fiber by the OTDR. In the present specification, the method is described as "different detection method". Using the different detection method and the method disclosed in Patent Literature 1 together makes it possible to determine whether the target optical fiber is the active optical fiber or the inactive optical fiber, irrespective of a power-on/power-off state of the ONU.

However, a problem with the method is that, in a case where a reflection signal caused by multiple reflection appears in an OTDR waveform, it is difficult to correctly determine whether the terminal portion of the target optical fiber is connected to the ONU in the power-off state.

In a case where optical reflectance distribution of an optical fiber to be measured is measured by using the OTDR, when a plurality of reflection points is present in the optical fiber to be measured, a reflection signal caused by multiple reflection in which a test light pulse repeats reflection a plurality of times between the reflection points, is commonly observed. In a normal connection mode of the OTDR and the optical fiber to be measured, it is possible to determine, from a level of Rayleigh scattered light, whether the reflection signal in the OTDR waveform is a reflection signal caused by multiple reflection. In the different detection method, however, since the OTDR and the optical fiber to be measured are connected at the bent portion, connection loss is large and it is difficult to observe the level of Rayleigh scattered light. Therefore, it is difficult for the different detection method to determine whether the reflection signal in the OTDR waveform is a reflection signal caused by multiple reflection.

In other words, by the different detection method, when it is determined whether the terminal portion of the target optical fiber is connected to the ONU in the power-off state, in a case where a plurality of reflection points are present in the optical fiber and a reflection signal caused by multiple reflection appears in the OTDR waveform, it is difficult to distinguish the reflection signal from the terminal portion of the optical fiber and the reflection signal caused by multiple reflection. Therefore, it is difficult for the different detection method to correctly determine whether the terminal portion of the target optical fiber is connected to the ONU in the power-off state.

An object of the present invention, which has been made in consideration of the above-described problems, is to provide a terminal determination device and a terminal determination method, which enable identification of a reflection signal from a terminal portion of an optical fiber to be measured even in a case where a reflection signal caused by multiple reflection appears in the OTDR waveform in a mode in which the OTDR and the optical fiber to be measured are connected at the bent portion.

Means for Solving the Problem

To solve the above-described problems, a terminal determination device and a terminal determination method according to the present invention detect a peak of a terminal by comparing a plurality of peaks in an OTDR waveform caused by multiple reflection.

More specifically, a terminal determination device according to the present invention includes: an optical reflectance distribution measurement device configured to measure reflectance distribution of an optical fiber to be measured by receiving reflection light of test light entering the optical fiber to be measured; a side light input/output unit configured to form a bent portion in a predetermined bent shape at an arbitrary position of the optical fiber to be measured, to cause the test light to enter from the bent portion to a core of the optical fiber to be measured, and to output the reflection light propagating through the core of the optical fiber to be measured from the bent portion to outside; and a measurement data analysis unit configured to perform a determination operation by detecting a plurality of peaks included in the reflectance distribution, and comparing the peaks to determine a terminal of the optical fiber to be measured from the peaks.

Further, a terminal determination method according to the present invention includes: forming a bent portion in a predetermined bent shape, at an arbitrary position of an optical fiber to be measured; causing test light to enter a core of the optical fiber to be measured from the bent portion; outputting reflection light of the test light from the bent portion to outside of the optical fiber to be measured; measuring reflectance distribution of the optical fiber to be measured, by receiving the reflection light; and performing a determination operation by detecting a plurality of peaks included in the reflectance distribution, and comparing the peaks to determine a terminal of the optical fiber to be measured from the peaks.

In the terminal determination device and the terminal determination method, the determination operation to find the peak by the terminal of the optical fiber to be measured is performed by using relationship among the plurality of peaks caused by multiple reflection. Therefore, the present invention can provide the terminal determination device and the terminal determination method, which enable identification of the reflection signal from the terminal portion of the optical fiber to be measured even in a case where the reflection signal caused by multiple reflection appears in the OTDR waveform in the mode in which the OTDR and the optical fiber to be measured are connected at the bent portion.

An example of the determination operation is described.

When N is a total number of peaks, i is a number of each of the peaks from the optical reflectance distribution measurement device side, and $x_i$ is a distance of each of the peaks from the optical reflectance distribution measurement device side, the determination operation by the measurement data analysis unit includes, with respect to a farthest peak farthest from the optical reflectance distribution measurement device from the peaks: representing the distances of the peaks except for the farthest peak, by an (N−1)-order column vector $d_{N-1}$ in an expression C1; representing the distances between any two of the peaks, by an N×N matrix A in an expression C2; representing components in an N-th column of the matrix A, by a column vector $\{x\}$ in an expression C3; comparing components of the column vector $\{x\}$ with components of the column vector $d_{N-1}$ and components of the matrix A except for the components in the N-th column; and in a case where values of the components are not coincident with one another, determining the farthest peak as a terminal of the optical fiber to be measured, or in a case where the values of the components are coincident with one another, repeating the determination operation by changing N to N−1.

[Math. C1]

$$d_{N-1} = \begin{pmatrix} x_1 \\ x_2 \\ \vdots \\ x_i \\ \vdots \\ x_{N-1} \end{pmatrix} \quad (C1)$$

[Math. C2]

$$A = [\Delta x_{ij}] = \begin{pmatrix} 0 & \Delta x_{21} & \ldots & \Delta x_{i1} & \ldots & \Delta x_{N1} \\ * & 0 & \ldots & \Delta x_{i2} & \ldots & \Delta x_{N2} \\ * & * & \ddots & \vdots & \ddots & \vdots \\ * & * & * & 0 & \ldots & \vdots \\ * & * & * & * & \ddots & \vdots \\ * & * & * & * & * & 0 \end{pmatrix} \quad (C2)$$

where $\Delta x_{ij}$ is a distance between an i-th reflection signal and a j-th reflection signal, represented by $\Delta x_{ij} = |x_i - x_j|$, and a symbol "*" represents an unnecessary component.

[Math. C3]

$$\{x\} = \begin{pmatrix} \Delta x_{N1} \\ \Delta x_{N2} \\ \vdots \\ \Delta x_{NN-1} \end{pmatrix} \quad (C3)$$

Another example of the determination operation is described.

The optical reflectance distribution measurement device causes the test light with a plurality of wavelengths to enter the optical fiber to be measured, and the determination operation by the measurement data analysis unit includes determining the peak that is present in all of the wavelengths and is farthest from the optical reflectance distribution measurement device, as the terminal of the optical fiber to be measured.

Note that the above-described inventions can be combined as far as possible.

Effects of the Invention

The present invention can provide the terminal determination device and the terminal determination method, which enable identification of the reflection signal from the terminal portion of the optical fiber even in the case where a reflection signal caused by multiple reflection appears in the OTDR waveform in the mode in which the OTDR and the optical fiber to be measured are connected at the bent portion.

DESCRIPTION OF EMBODIMENTS

Some embodiments of the present invention are described with reference to accompanying drawings. The embodiments described below are implementation examples of the present invention, and the present invention is not limited to the following embodiments. Note that, in the present specification and the drawings, the same components are denoted by the same reference numerals.

Embodiment 1

Figure 1:
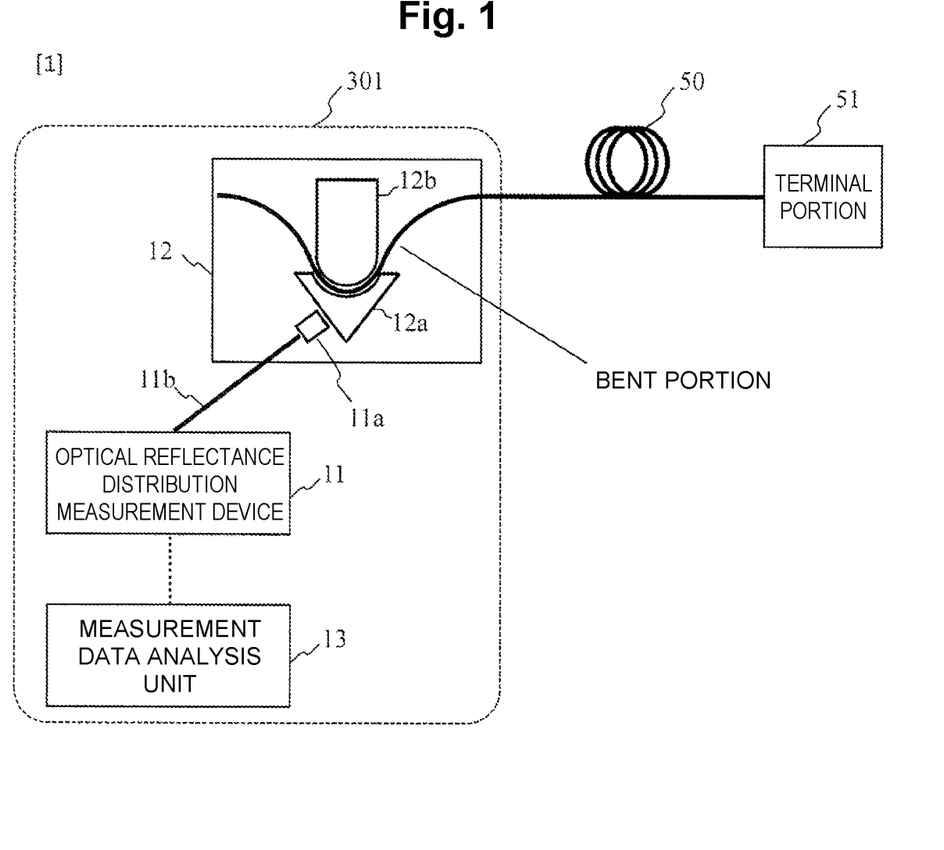
FIG. 1 is a configuration diagram illustrating a terminal determination device according to the present invention.

FIG. 1 is a configuration diagram illustrating a terminal determination device 301 according to the present embodiment. The terminal determination device 301 includes: an optical reflectance distribution measurement device 11 configured to measure reflectance distribution of an optical fiber to be measured 50 by receiving reflection light of test light entering the optical fiber to be measured 50; a side light input/output unit 12 configured to form a bent portion in a predetermined bent shape at an arbitrary position of the optical fiber to be measured 50, to cause the test light to enter a core of the optical fiber to be measured 50 from the bent portion, and to output the reflection light propagating through the core of the optical fiber to be measured 50 from the bent portion to outside; and a measurement data analysis unit 13 configured to perform a determination operation by detecting a plurality of peaks included in the reflectance distribution and comparing the peaks to determine a terminal portion 51 of the optical fiber to be measured 50 from the peaks.

The side light input/output unit 12 outputs light propagating through the core of an optical fiber as leakage light to the outside by applying the predetermined bent shape to the optical fiber to be measured 50, and inputs light from the outside into the core of the optical fiber. The optical reflectance distribution measurement device 11 measures the reflectance distribution of the optical fiber to be measured 50 at a plurality of wavelengths. The measurement data analysis unit 13 analyzes the reflectance. The terminal determination device 301 uses the three components to determine whether an ONU in a power-off state is connected to the terminal portion 51 of the optical fiber, from an arbitrary position where the core of the optical fiber to be measured 50 is exposed, on a downstream of an external SP.

The optical reflectance distribution measurement device 11 has functions to emit test light with a plurality of different center wavelengths and to receive optical reflectance distribution in a longitudinal direction of the optical fiber. A multi-wavelength OTDR or an OFDR (Optical Frequency Domain Reflectometer) is usable. In the present embodiment, measurement by the OTDR is used and described.

The test light output from the OTDR 11 enters a probe optical fiber 11b including a gradient index (GRIN) lens 11a attached at a front end. In this example, a general-purpose single mode fiber is used for the probe optical fiber 11b, and a GRIN lens 11a has a focal length of 1090 µm at a beam waist width of 27 µm.

The condensed test light output from the GRIN lens 11a passes through a concave block 12a, and then enters the optical fiber to be measured 50 that has the predetermined bent shape (bent portion) formed by being sandwiched between a convex block 12b and the concave block 12a. The convex block 12b is made of a material having a refractive index greater than a refractive index (approximately 1.5) of an optical fiber coating, in order to reduce reflection of the light leaking from the optical fiber to be measured 50 by the convex block 12b. For example, the convex block 12b is made of glass or polycarbonate having a refractive index of 1.57. Further, the bent shape of the optical fiber to be measured 50 has a radius of curvature of 2 mm and a bent angle of 90 degrees in a plane illustrated in FIG. 1.

A length of the optical fiber to be measured 50 is approximately 1000 m. The test light input the optical fiber to be measured 50 propagates through the optical fiber to be measured 50, and enters the terminal portion 51 thereof. The test light entering the terminal portion 51 is reflected at a reflectance corresponding to a state of an optical fiber end surface of the terminal portion 51 and a refractive index of a layer contacting with the optical fiber end surface.

The reflection light from the terminal portion 51 passes through the same path as the test light in an opposite direction, propagates through the optical fiber to be measured 50 by 1000 m. Thereafter, the reflection light leaks from the bent portion of the optical fiber to be measured 50 bent by the side light input/output unit 12, passes through the concave block 12a, and then enters the GRIN lens 11a. The reflection light having entered the GRIN lens 11a enters the OTDR 11 through the probe fiber 11b. The reflection light having entered the OTDR 11 is analyzed by the measurement data analysis unit 13. As a result, optical reflectance distribution in the longitudinal direction of the optical fiber to be measured 50, namely, an OTDR wave form is obtained.

Figure 2:
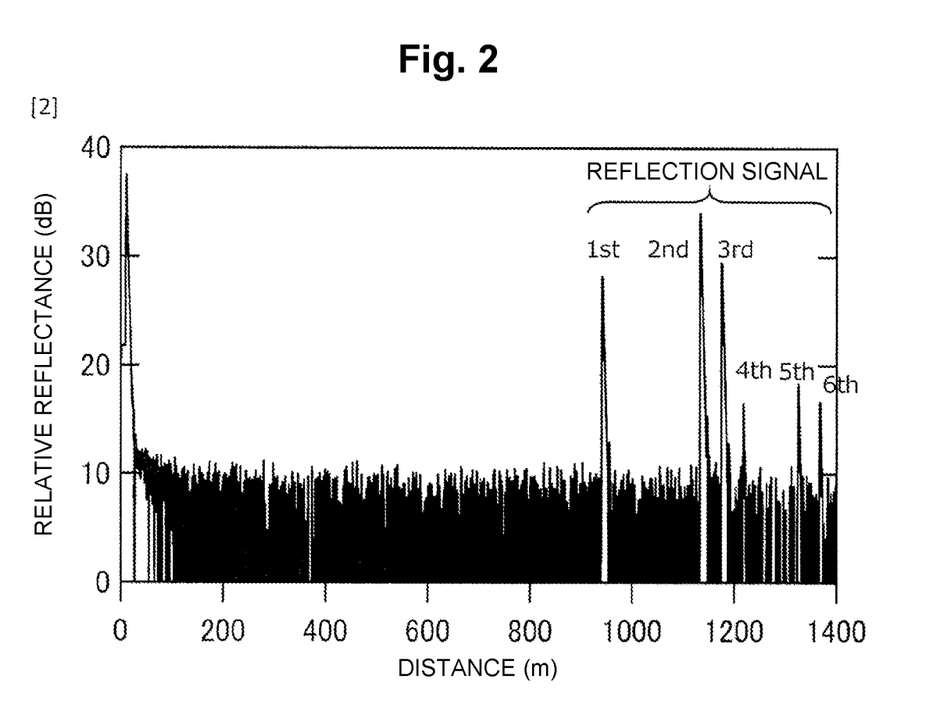
FIG. 2 is a diagram illustrating an OTDR waveform including multiple reflection.

FIG. 2 illustrates an example of the OTDR waveform measured by the terminal determination device 301. In this example, a wavelength of the test light is 1550 nm, a pulse width of the test light is 10 ns, and the number of averaging times of the measurement is $2^{13}$ (=8192). In the OTDR waveform, six reflection signals (peaks) are present other than reflection at a port of the OTDR 11 (reflection by bent portion). Therefore, it is not possible to visually determine whether a reflection signal caused by multiple reflection is included, and which peak represents reflection from the terminal portion 51 of the optical fiber to be measured 50.

Therefore, the terminal determination device 301 performs the determination operation by the measurement data analysis unit 13, to identify a reflection signal representing reflection from the terminal portion 51 of the optical fiber, in addition to determination whether multiple reflection is included in the OTDR waveform. An example of the determination operation is described below.

As a principle of the determination operation, it is determined whether a distance between the reflection signal to be determined and another reflection signal is coincident with a distance between the other reflection signals, and the determination is performed in order from the reflection signal farthest from the OTDR 11. At this time, as the premise, "distance from OTDR 11 to each of reflection signals is not equal to distance between reflection signals". Under the above-described premise, the reflection signal caused by multiple reflection inevitably propagates through a distance equal to a distance between true reflection points more than the other reflection point, because of multiple reflection. Therefore, the distance between the reflection signal and another reflection signal is inevitably coincident with the distance between the other reflection signals. In contrast, in a case of the reflection signal from the terminal portion 51 of the optical fiber, the distance between the reflection signal and another reflection signal is not coincident with the distance between the other reflection signals.

The method of the determination operation is generalized and described.

A case where N reflection signals are present in the OTDR waveform, and i-th reflection signal counted from the port of the OTDR 11 is reflection from the terminal portion 51 of the optical fiber is considered. At this time, i=1, 2, . . . , N, and the reflection signal by the port of the OTDR 11 is handled as an origin, namely, as a 0-th reflection signal. When a distance of the i-th reflection signal from the OTDR 11 is denoted by $x_i$, distances of the N reflection signals from the OTDR 11 are represented by the following N-order column vector $\{d_N\}$.

[Math. 0]

$$\{d_N\} = \begin{pmatrix} x_1 \\ x_2 \\ \vdots \\ x_i \\ \vdots \\ x_N \end{pmatrix} \quad (0)$$

Further, a distance $\Delta x_{ij}$ between the i-th reflection signal and a j-th reflection signal is in an expression (1).

[Math. 1]

$$\Delta x_{ij} = |x_j - x_i| \quad (1)$$

where j=1, 2, . . . , N≦i

From the expression (1), all distances between any two of the reflection signals in the OTDR waveform are represented by the following N×N matrix A.

[Math. 2]

$$A = [\Delta x_{ij}] = \begin{pmatrix} \Delta x_{11} & \Delta x_{21} & \cdots & \Delta x_{i1} & \cdots & \Delta x_{N1} \\ \Delta x_{12} & \Delta x_{22} & \cdots & \Delta x_{i2} & \cdots & \Delta x_{N2} \\ \vdots & \vdots & \ddots & \vdots & \ddots & \vdots \\ \Delta x_{1j} & \Delta x_{2j} & \cdots & \Delta x_{ij} & \cdots & \Delta x_{Nj} \\ \vdots & \vdots & \ddots & \vdots & \ddots & \vdots \\ \Delta x_{1N} & \Delta x_{2N} & \cdots & \Delta x_{iN} & \cdots & \Delta x_{NN} \end{pmatrix} \quad (2)$$

At this time, in a case of i=j, $\Delta x_{ij} = 0$ is established. Therefore, diagonal components of the matrix in the expression (2) are all zero. In addition, $\Delta x_{ij} = \Delta x_{ji}$ is established because of symmetry of the expression (1). Therefore, the matrix A only with significant components is represented as follows.

[Math. 3]

$$A = \begin{pmatrix} 0 & \Delta x_{21} & \cdots & \Delta x_{i1} & \cdots & \Delta x_{N1} \\ * & 0 & \cdots & \Delta x_{i2} & \cdots & \Delta x_{N2} \\ * & * & \ddots & \vdots & \ddots & \vdots \\ * & * & * & 0 & \cdots & \vdots \\ * & * & * & * & \ddots & \vdots \\ * & * & * & * & * & 0 \end{pmatrix} \quad (3)$$

In the expression, a symbol "*" represents an unnecessary component that is not handled in the following calculation.

Figure 3:
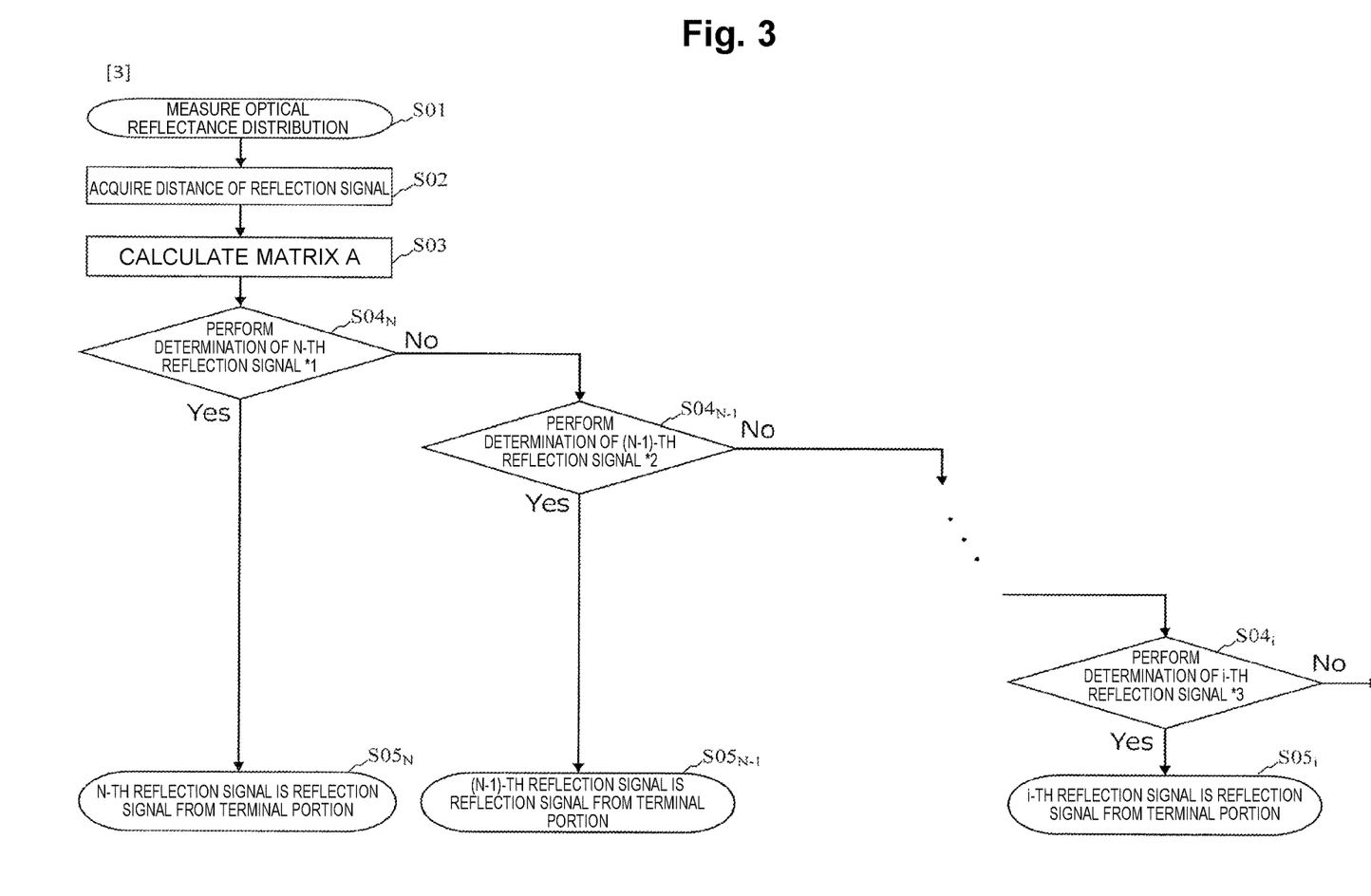
FIG. 3 is a flowchart illustrating a terminal determination method according to the present invention.

FIG. 3 is a flowchart illustrating a terminal determination method performed by the terminal determination device 301. The terminal determination method determines a state of the terminal portion 51 by using the matrix A. Note that, as described above, as the premise, the distance from the OTDR 11 to each of the reflection signals is not equal to the distance between the reflection signals.

The terminal determination method includes: forming a bent portion in a predetermined bent shape, at an arbitrary position of the optical fiber to be measured 50 (work 1); causing test light to enter a core of the optical fiber to be measured 50 from the bent portion (work 2); outputting reflection light of the test light from the bent portion to outside of the optical fiber to be measured 50 (work 3); measuring reflectance distribution of the optical fiber to be measured 50, by receiving the reflection light (work 4); and performing a determination operation by detecting a plurality of peaks included in the reflectance distribution, and comparing the peaks to determine the terminal portion 51 of the optical fiber to be measured 50 from the peaks (work 5).

The work 1 to the work 4 correspond to step S01 in FIG. 3, and the work 5 corresponds to step S02 and subsequent steps in FIG. 3.

First, processing in step S01 is performed by the side light input/output unit 12 and the OTDR 11, to measure the optical reflectance distribution of the optical fiber to be measured 50.

The determination operation in step S02 and subsequent steps includes, with respect to the farthest peak farthest from the optical reflectance distribution measurement device 11 from the peaks: representing the distances of the peaks except for the farthest peak, by a (N−1)-order column vector $d_{N-1}$ in an expression (4); representing the distances between any two of the peaks, by an N×N matrix A in the expression (2); representing components in the N-th column of the matrix A, by a column vector {x} in an expression (4); comparing components of the column vector {x} with components of the column vector $d_{N-1}$ and the components of the matrix A except for the components in the N-th column; and in a case where values of the components are not coincident with one another, determining the farthest peak as a terminal of the optical fiber to be measured, or in a case where the values of the components are coincident with one another, repeating the determination operation by changing N to N−1.

The measurement data analysis unit 13 acquires the distance $\Delta x_{ij}$ between any two of the peaks from the optical reflectance distribution (step S02). The measurement data analysis unit 13 calculates the matrix A in the expression (3) from the distance $\Delta x_{ij}$ (step S03).

Next, the determination operation to determine whether the reflection signal is a reflection signal caused by multiple reflection is performed in order from, among the N peaks (reflection signals), the N-th reflection signal farthest from the port of the OTDR 11 (step S04$_N$). The determination operation uses the above-described principle that the distance between the reflection signal caused by multiple reflection and each of the other reflection signals is inevitably coincident with the distance between the true reflection signals.

First, a vector $\{x_{N-1}\}$ that indicates relative distances between the N-th reflection signal and each of the other reflection signals becomes an (N−1)-order column vector in the N-th column of the matrix A in the expression (3).

[Math. 4]

$$\{x_{N-1}\} = \begin{pmatrix} \Delta x_{N1} \\ \Delta x_{N2} \\ \vdots \\ \Delta x_{NN-1} \end{pmatrix} \quad (4)$$

Next, as distances among the reflection signals except for the N-th reflection signal, distances $\{d_{N-1}\}$ between reflection from a connection point with the optical fiber to be measured 50 at the port of the OTDR 11 and each of the N−1 reflection signals are in an expression (5).

[Math. 5]

$$\{d_{N-1}\} = \begin{pmatrix} x_1 \\ x_2 \\ \vdots \\ x_i \\ \vdots \\ x_{N-1} \end{pmatrix} \quad (5)$$

In other words, distances between any two of the reflection signals except for the reflection from the connection point at the port of the OTDR 11 and the N-th reflection are all of remaining components except for the components in the N-th column of the matrix A.

Therefore, the components of the (N−1)-order column vector $\{x_{N-1}\}$ in the N-th column of the matrix A are compared with all of the remaining components except for the components of the (N−1)-order column vector of the distance $\{d_{N-1}\}$ and the components in the N-th column of the matrix A, thereby determining whether components having coincident values are present.

As a result of the determination, in a case where components having coincident values are not present (all components of vector $\{x_{N-1}\}$ are not coincident with components of distances $\{d_{N-1}\}$ of reflection signals and components of column vectors in first to (N−1)-th columns of matrix A) ("Yes" in step S04$_N$), the N-th reflection signal is identified as being reflection from the terminal portion 51 of the optical fiber to be measured 50 (step S05$_N$).

In contrast, as a result of the determination, in a case where components having coincident values are present (all components of vector $\{x_{N-1}\}$ are coincident with any of components of distances $\{d_{N-1}\}$ of reflection signals and components of column vectors in first to (N−1)-th columns of matrix A) ("No" in step S04$_N$), it is determined that the N-th reflection signal is caused by multiple reflection.

In a case where it is determined that the N-th reflection signal is caused by multiple reflection, the measurement data analysis unit 13 then performs determination of the (N−1)-th reflection signal (step S04$_{N-1}$) in order to identify the terminal portion 51 of the optical fiber to be measured 50. The determination of the (N−1)-th reflection signal is performed in the following manner.

A vector $\{x_{N-2}\}$ that indicates relative distances between the (N−1)-th reflection signal and each of the other reflection signals (except for N-th reflection signal) becomes (N−2)-order column vector in the (N−1)-th column of the matrix A in the expression (3). The vector $\{x_{N-2}\}$ is in an expression (6).

[Math. 6]

$$\{x_{N-2}\} = \begin{pmatrix} \Delta x_{N-11} \\ \Delta x_{N-12} \\ \vdots \\ \Delta x_{N-1j} \\ \vdots \\ \Delta x_{N-1N-2} \end{pmatrix} \quad (6)$$

Next, as distances among the reflection signals except for the N-th reflection signal and the (N−1)-th reflection signal, distances $\{d_{N-2}\}$ between the reflection from the connection point with the optical fiber to be measured 50 at the port of the OTDR 11 and each of the N−1 reflection signals are in an expression (7).

[Math. 7]

$$\{d_{N-2}\} = \begin{pmatrix} x_1 \\ x_2 \\ \vdots \\ x_i \\ \vdots \\ x_{N-2} \end{pmatrix} \quad (7)$$

In other words, distances between any two of the reflection signals except for the reflection from the connection point at the port of the OTDR 11, the N-th reflection, and the (N−1)-th reflection are all of remaining components except for the components in the N-th column and the (N−1)-th column of the matrix A.

Likewise, the components of the (N−2)-order column vector $\{x_{N-2}\}$ in the (N−1)-th column of the matrix A are compared with all of the remaining components except for the components of the (N−2)-order column vector of the distances $\{d_{N-2}\}$ and the components in the N-th column and the (N−1)-th column of the matrix A, thereby determining whether components having coincident values are present.

As a result of the determination, in a case where components having coincident values are not present (all components of vector $\{x_{N-2}\}$ are not coincident with components distances $\{d_{i-2}\}$ of reflection signals and components of column vectors in first to (N−2)-th columns of matrix A ("Yes" in step S04$_{N-1}$), the (N−1)-th reflection signal is identified as being reflection from the terminal portion 51 of the optical fiber to be measured 50 (step S05$_{N-1}$).

In contrast, as a result of the determination, in a case where components having coincident values are present (all components of vector $\{x_{N-2}\}$ are coincident with any of components of distances $\{d_{N-2}\}$ of reflection signals and components of column vectors in first to (N−2)-th columns of matrix A) ("No" in step S04$_{N-1}$), it is determined that the (N−1)-th reflection signal is caused by multiple reflection.

In a case where the (N−1)-th reflection signal is also caused by multiple reflection, the measurement data analysis unit 13 then performs determination of the (N−2)-th reflection signal. In the above-described manner, the measurement data analysis unit 13 sequentially performs determination in order from the N-th reflection signal farthest from the OTDR 11.

Likewise, in a case where determination is performed on an i-th reflection signal (step S04$_i$), when the reflection signal is a reflection signal from the terminal portion 51 of the optical fiber to be measured 50 ("Yes" in step S04$_i$), all components of an (N−i)-order column vector in an i-th column of the matrix A in an expression (8) are not coincident with all components of (i−1)-order column vector in an expression (9) as distances of up to (i−1)-th reflection signal, and all of components of the column vectors in the first to (i−1)-th columns of the matrix A.

[Math. 8]

$$\{x_{i-1}\} = \begin{pmatrix} \Delta x_{i1} \\ \Delta x_{i2} \\ \vdots \\ \Delta x_{ii-1} \end{pmatrix} \quad (8)$$

[Math. 9]

$$\{d_{i-1}\} = \begin{pmatrix} x_1 \\ x_2 \\ \vdots \\ x_{i-1} \end{pmatrix} \quad (9)$$

As described above, using the determination flow in FIG. 3 makes it possible to identify that N reflection signals are present in the OTDR waveform and the i-th reflection signal counted from the port of the OTDR 11 is reflection from the terminal portion 51 of the optical fiber to be measured 50.

When the above-described method is applied to the OTDR waveform illustrated in FIG. 2, fourth to sixth reflection signals are determined as reflection signals caused by multiple reflection, and a third reflection signal is identified as a reflection signal from the terminal portion 51 of the optical fiber.

Embodiment 2

In the present embodiment, another example of the determination operation is described.

In the determination operation according to the present embodiment, multiple reflection and reflection from the terminal portion 51 are identified based on reflectance distribution acquired at a plurality of wavelengths, in place of the premise condition "distance from OTDR 11 to each of reflection signals is not equal to distance between reflection signals" for the determination operation described in Embodiment 1.

As a principle of the determination operation according to the present embodiment, it is determined whether a reflection signal present in a certain acquired distance is present common to all of measurement wavelengths. The farthest reflection signal present in the distance common to all of the measurement wavelengths is a reflection signal from the terminal portion 51 of the optical fiber, and reflection signals farther from the reflection signal are all reflection signals caused by multiple reflection. This is established on an assumption that at least one measurement wavelength at which the reflection signal caused by multiple reflection does not appear exists.

A terminal determination device according to the present embodiment has the configuration same as the configuration of the terminal determination device 301 described in Embodiment 1. The terminal determination device according to the present embodiment is different in the analysis method by the measurement data analysis unit 13 from the terminal determination device 301.

Figure 4:
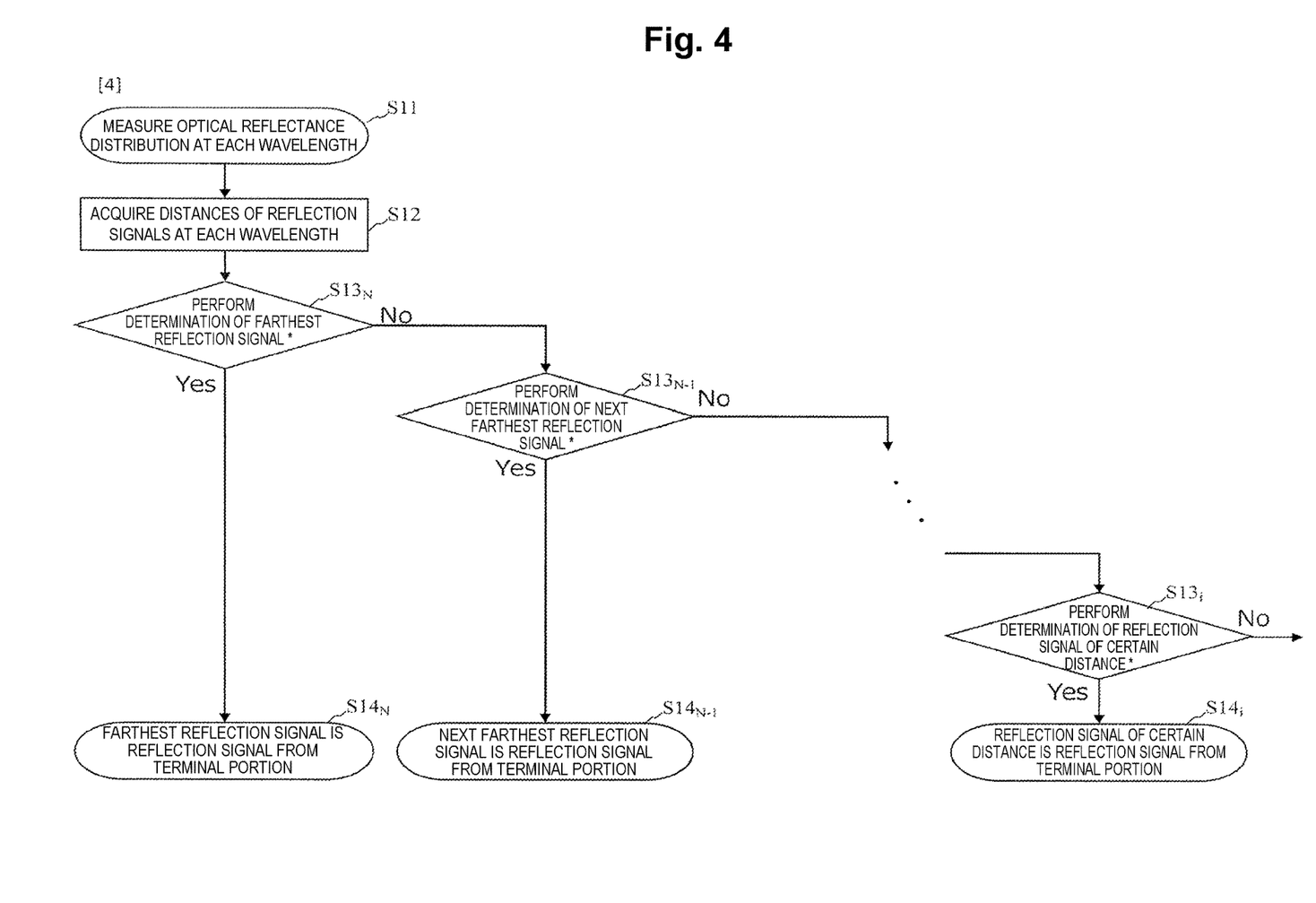
FIG. 4 is a flowchart illustrating the terminal determination method according to the present invention.

FIG. 4 is a flowchart illustrating a terminal determination method performed by the terminal determination device according to the present embodiment. Step S11 corresponds to the work 1 to the work 4 described in Embodiment 1. To acquire reflectance distribution at the plurality of wavelengths, the OTDR 11 causes test light with the plurality of wavelengths to enter the optical fiber to be measured 50.

After the OTDR waveform at each of the wavelengths is measured, the measurement data analysis unit 13 acquires distances of the reflection signals at each of the wavelengths (step S12). Next, determination is performed on the reflection signals at each of the wavelengths. The determination is performed in order from the reflection signal farthest from the OTDR 11 based on the above-described principle of the determination operation (step S13$_N$). In a case where the reflection signal of the target distance is present common to the reflectance distribution of all of the wavelengths ("Yes" in step S13$_N$), the N-th reflection signal is identified as being reflection from the terminal portion 51 of the optical fiber to be measured 50 (step S14$_N$). The measurement data analysis unit 13 ends the determination operation at a time when the reflection signal from the terminal portion 51 of the optical fiber to be measured 50 is identified.

In contrast, in a case where the reflection signal of the target distance is not present common to all of the measurement wavelengths ("No" in step S13$_N$), it is determined that the N-th reflection signal is a reflection signal caused by multiple reflection. In a case where it is determined that the N-th reflection signal is caused by multiple reflection, the measurement data analysis unit 13 performs determination of next farthest reflection signal (step S13$_{N-1}$). In step S13$_{N-1}$, the determination is also performed in a manner similar to step S13$_N$, and it is determined whether the (N−1)-th reflection signal is reflection from the terminal portion 51 of the optical fiber to be measured 50, or is caused by multiple reflection.

As described above, the measurement data analysis unit 13 performs the determination in order from the reflection signal farthest from the OTDR 11 (step S13$_i$), and identifies the reflection signal that is first determined to be present in the distance common to all of the measurement wavelengths, as the reflection signal from the terminal portion 51 of the optical fiber to be measured 50 (step S14$_i$). Other reflection signals are caused by multiple reflection. Therefore, the measurement data analysis unit 13 ends the determination operation at a time when the reflection signal from the terminal portion 51 of the optical fiber to be measured 50 is identified.

Figure 5:
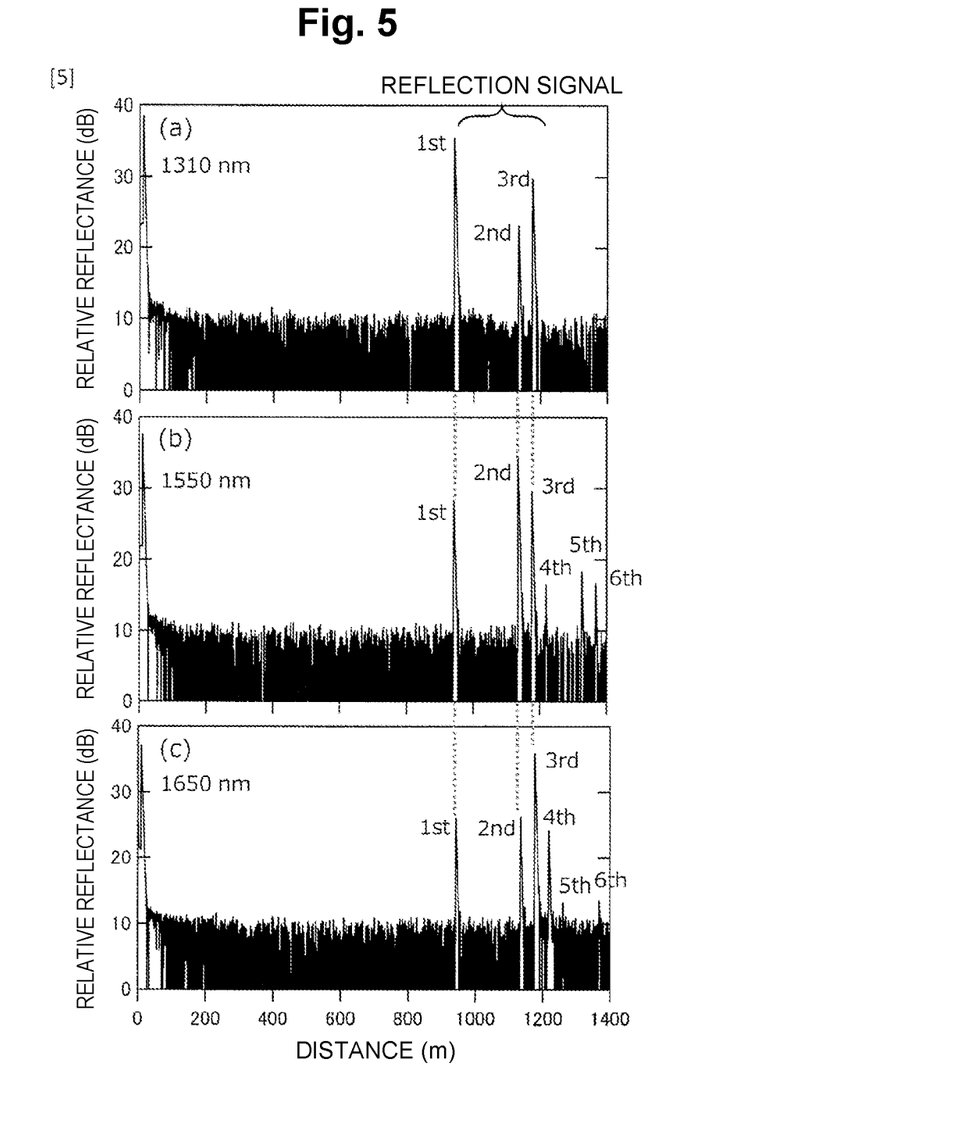
FIG. 5 is a diagram illustrating an OTDR waveform acquired by the terminal determination device according to the present invention.

FIG. 5 is a diagram illustrating reflectance distribution (OTDR waveforms) acquired by the OTDR 11 according to the present embodiment. FIGS. 5(a), 5(b), and 5(c) respectively illustrate the reflectance distribution at the measurement wavelengths of 1310 nm, 1550 nm, and 1650 nm. A pulse width of the test light and the number of averaging times of the measurement are respectively 10 ns and $2^{13}$ (=8192) as in Embodiment 1.

Fourth to sixth reflection signals in the OTDR waveform in each of FIG. 5(b) and FIG. 5(c) are not present in the OTDR waveform in FIG. 5(a). Therefore, these reflection signals are determined as reflection signals caused by multiple reflection. On the other hand, a third reflection signal in the OTDR waveform is present at a distance common to the OTDR waveforms at all of the measurement wavelengths in FIGS. 5(a) to 5 (c). Therefore, the third reflection signal can be identified as a reflection signal from the terminal portion 51 of the optical fiber.

Other Embodiments

The measurement data analysis unit 13 can be realized by a computer and programs, and the programs can be recorded in a recording medium or provided through a network.

Effects

According to the present invention, in the mode in which the OTDR 11 and the optical fiber to be measured 50 are connected at the bent portion, even in the case where the reflection signal caused by multiple reflection appears in the OTDR waveform, it is possible to identify the reflection signal from the terminal portion 51 of the optical fiber.

INDUSTRIAL APPLICABILITY

The present invention is applicable to a work in which, in an optical line in a PON (Passive Optical Network) mode, test light is caused to enter an optical fiber on a downstream of an external branch splitter, from a side of the optical fiber, to determine a terminal state of a target optical fiber on a user home side, from an arbitrary position on the downstream of the external branch splitter.

REFERENCE SIGNS LIST

11 Optical reflectance distribution measurement device (OTDR)
11a GRIN lens
11b Probe optical fiber
12 Side light input/output unit
12a Concave block
12b Convex block
13 Measurement data analysis unit
50 Optical fiber to be measured
51 Terminal portion
301 Terminal determination device

The invention claimed is:

1. A terminal determination device configured to:
measure reflectance distribution of an optical fiber to be measured by receiving reflection light of test light with a plurality of wavelengths to enter the optical fiber to be measured;
form a bent portion in a predetermined bent shape at an arbitrary position of the optical fiber to be measured, to cause the test light to enter from the bent portion to a core of the optical fiber to be measured, and to output the reflection light propagating through the core of the optical fiber to be measured from the bent portion to outside,
perform a determination operation by detecting a plurality of peaks included in the reflectance distribution, and comparing the peaks to determine a terminal of the optical fiber to be measured,
wherein, when N is a total number of peaks, i is a number of each of the peaks from a side of an optical reflectance distribution measurement device of the terminal determination device, and $x_i$ is a distance of each of the peaks from the side of the optical reflectance distribution measurement device, the determination operation includes, with respect to a farthest peak farthest from the optical reflectance distribution measurement device from the peaks;
representing the distances of the peaks except for the farthest peak, by an (N-1)-order column vector $d_{N-1}$ in an expression C1;
representing the distances between any two of the peaks, by an N×N matrix A in an expression C2;
representing components in an N-th column of the matrix A, by a column vector {x} in an expression C3;
comparing components of the column vector {x} with components of the column vector $d_{N-1}$ and components of the matrix A except for the components in the N-th column;
in a case where values of the components are not coincident with one another, determining the farthest peak as a terminal of the optical fiber to be measured, or
in a case where the values of the components are coincident with one another, repeating the determination operation by changing N to N-1; and wherein expression for C1 is $$d_{N-1} = \begin{pmatrix} x_1 \\ x_2 \\ \vdots \\ x_i \\ \vdots \\ x_{N-1} \end{pmatrix}$$

wherein expression for C2 is $$A = [\Delta x_{ij}] = \begin{pmatrix} 0 & \Delta x_{21} & \cdots & \Delta x_{i1} & \cdots & \Delta x_{N1} \\ * & 0 & \cdots & \Delta x_{i2} & \cdots & \Delta x_{N2} \\ * & * & \ddots & \vdots & \ddots & \vdots \\ * & * & * & 0 & \cdots & \vdots \\ * & * & * & * & \ddots & \vdots \\ * & * & * & * & * & 0 \end{pmatrix}$$

wherein expression for C3 is $$\{x\} = \begin{pmatrix} \Delta x_{N1} \\ \Delta x_{N2} \\ \vdots \\ \Delta x_{NN-1} \end{pmatrix}$$

where $\Delta x_{ij}$ is a distance between an i-th reflection signal and a j-th reflection signal, represented by $\Delta x_{ij}=|X_i-X_j|$, and a symbol "*" represents an unnecessary component.

2. A terminal determination device configured to:
measure reflectance distribution of an optical fiber to be measured by receiving reflection light of test light with a plurality of wavelengths to enter the optical fiber to be measured;

form a bent portion in a predetermined bent shape at an arbitrary position of the optical fiber to be measured, to cause the test light to enter from the bent portion to a core of the optical fiber to be measured, and to output the reflection light propagating through the core of the optical fiber to be measured from the bent portion to outside; and perform a determination operation by detecting a plurality of peaks included in the reflectance distribution, and comparing the peaks to determine a terminal of the optical fiber to be measured, wherein an optical reflectance distribution measurement device causes the test light with a plurality of wavelengths to enter the optical fiber to be measured, and the determination operation includes determining the peak that is present in all of the wavelengths and is farthest from the optical reflectance distribution measurement device, as the terminal of the optical fiber to be measured.

3. A terminal determination method, comprising:

forming a bent portion in a predetermined bent shape, at an arbitrary position of an optical fiber to be measured;

causing test light to enter a core of the optical fiber to be measured from the bent portion;

outputting reflection light of the test light from the bent portion to outside of the optical fiber to be measured;

measuring reflectance distribution of the optical fiber to be measured, by receiving the reflection light;

performing a determination operation by detecting a plurality of peaks included in the reflectance distribution, and comparing the peaks to determine a terminal of the optical fiber to be measured from the peaks, wherein, when N is a total number of peaks, i is a number of each of the peaks from a side of an optical reflectance distribution measurement device, and xi is a distance of each of the peaks from the side of the optical reflectance distribution measurement device, the determination operation unit includes, with respect to a farthest peak farthest from the optical reflectance distribution measurement device from the peaks;

representing the distances of the peaks except for the farthest peak, by an (N-1)-order column vector $d_{N-1}$ in an expression C1;

representing the distances between any two of the peaks, by an N×N matrix A in an expression C2;

representing components in an N-th column of the matrix A, by a column vector $\{x\}$ in an expression C3;

comparing components of the column vector $\{x\}$ with components of the column vector $d_{N-1}$ and components of the matrix A except for the components in the N-th column;

in a case where values of the components are not coincident with one another, determining the farthest peak as a terminal of the optical fiber to be measured, or in a case where the values of the components are coincident with one another, repeating the determination operation by changing N to N-1; and wherein expression for C1 is $$d_{N-1} = \begin{pmatrix} x_1 \\ x_2 \\ \vdots \\ x_i \\ \vdots \\ x_{N-1} \end{pmatrix}$$

wherein expression for C2 is $$A = [\Delta x_{ij}] = \begin{pmatrix} 0 & \Delta x_{21} & \cdots & \Delta x_{i1} & \cdots & \Delta x_{N1} \\ * & 0 & \cdots & \Delta x_{i2} & \cdots & \Delta x_{N2} \\ * & * & \ddots & \vdots & \ddots & \vdots \\ * & * & * & 0 & \cdots & \vdots \\ * & * & * & * & \ddots & \vdots \\ * & * & * & * & * & 0 \end{pmatrix}$$

wherein expression for C3 is $$\{x\} = \begin{pmatrix} \Delta x_{N1} \\ \Delta x_{N2} \\ \vdots \\ \Delta x_{NN-1} \end{pmatrix}$$

where $\Delta x_{ij}$ is a distance between an i-th reflection signal and a j-th reflection signal, represented by $\Delta x_{ij} = |X_i - X_j|$, and a symbol "*" represents an unnecessary component.

4. A terminal determination method, comprising:

forming a bent portion in a predetermined bent shape, at an arbitrary position of an optical fiber to be measured;

causing test light to enter a core of the optical fiber to be measured from the bent portion;

outputting reflection light of the test light from the bent portion to outside of the optical fiber to be measured;

measuring reflectance distribution of the optical fiber to be measured, by receiving the reflection light; and performing a determination operation by detecting a plurality of peaks included in the reflectance distribution, and comparing the peaks to determine a terminal of the optical fiber to be measured from the peaks, wherein the test light has a plurality of wavelengths, and the determination operation includes determining the peak that is present in all of the wavelengths and is farthest from an optical reflectance distribution measurement device, as the terminal of the optical fiber to be measured.

* * * * *